(12) United States Patent
Surjo-Subagio et al.

(10) Patent No.: US 10,086,288 B1
(45) Date of Patent: Oct. 2, 2018

(54) CONTENT ITEM FORKING AND MERGING

(71) Applicant: Amazon Technologies, Inc., Seattle, WA (US)

(72) Inventors: Francis Xavier Surjo-Subagio, Irvine, CA (US); Brian David Fisher, Irvine, CA (US); David Edward Maldonado, Mission Viejo, CA (US); Patrick Gilmore, Agoura Hills, CA (US); Christopher Thomas Larson, Rancho Santa Margarita, CA (US); Yu Ping Hu, Mission Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 15/194,177

(22) Filed: Jun. 27, 2016

(51) Int. Cl.
*A63F 13/69* (2014.01)
*H04L 29/06* (2006.01)
*A63F 13/35* (2014.01)

(52) U.S. Cl.
CPC .............. *A63F 13/69* (2014.09); *A63F 13/35* (2014.09); *H04L 67/38* (2013.01)

(58) Field of Classification Search
CPC ................................ A63F 13/69; A63F 13/35
See application file for complete search history.

(56) References Cited

U.S. PATENT DOCUMENTS

| 9,409,083 | B2 | 8/2016 | George | |
|---|---|---|---|---|
| 2002/0094863 | A1* | 7/2002 | Klayh | A63F 13/12 463/21 |
| 2004/0005926 | A1* | 1/2004 | Lefroy | G07F 17/32 463/42 |
| 2007/0111794 | A1* | 5/2007 | Hogan | A63F 13/12 463/42 |
| 2009/0325136 | A1* | 12/2009 | Delbue | G09B 7/04 434/322 |
| 2012/0172133 | A1* | 7/2012 | Trexler | G07F 17/3227 463/42 |
| 2016/0082348 | A1* | 3/2016 | Kehoe | G06Q 10/101 463/31 |
| 2017/0189812 | A1* | 7/2017 | Ozer | A63F 13/73 |

* cited by examiner

*Primary Examiner* — Jason Skaarup
(74) *Attorney, Agent, or Firm* — Baker & Hostetler LLP

(57) ABSTRACT

Techniques for forking and merging of electronically presented content items, such as MMO and other video games, are described herein. In particular, a first content item session may be forked to generate a second (forked) content item session. The first and forked content item sessions may then continue to execute and evolve in separate directions from one another. In some examples, a user of the forked content item session may serve as an administrator of the forked content item session and may receive compensation in exchange for serving as an administrator. Additionally, one or more forked or other separate content item sessions may be merged together to form a merged content item session. In some examples, conflicts between merged content item sessions may be identified and resolved based, at least in part, on input from administrators.

20 Claims, 11 Drawing Sheets

CONTENT ITEM FORKING AND MERGING

BACKGROUND

The popularity of electronically presented content items, such as video games, has increased dramatically in recent years. In particular, certain video games, often referred to as massively multiplayer online (MMO) games, may allow large quantities of players to participate and compete with one another across a large virtual game world. Due in part to the size and scope of these and other games, some players may have a desire for greater control, privacy, and flexibility with respect to a virtual game world. However, many conventional video games offer few, if any, features for providing these types of options or experiences to players. Another problem related to the size and scope of MMO and other video games is that administration of these games may often be a time consuming process that may involve many different responsibilities. For example, administration of such games may include tasks such as dispute resolution between players, teams, etc., handling of technical and/or contextual questions about the game, regulating access to the game, training, mentoring, and making other decisions about features and attributes of the game. Game developers may often be tasked with handling administrative duties for a game, thereby consuming resources of the game developer that might be otherwise be used more efficiently. Additionally, many players may often end up helping or otherwise being involved with administrative chores, and the players may often not be rewarded for their efforts. When players are forced to provide unrewarded administrative assistance, they may become frustrated and their enjoyment and satisfaction with the games may be decreased.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
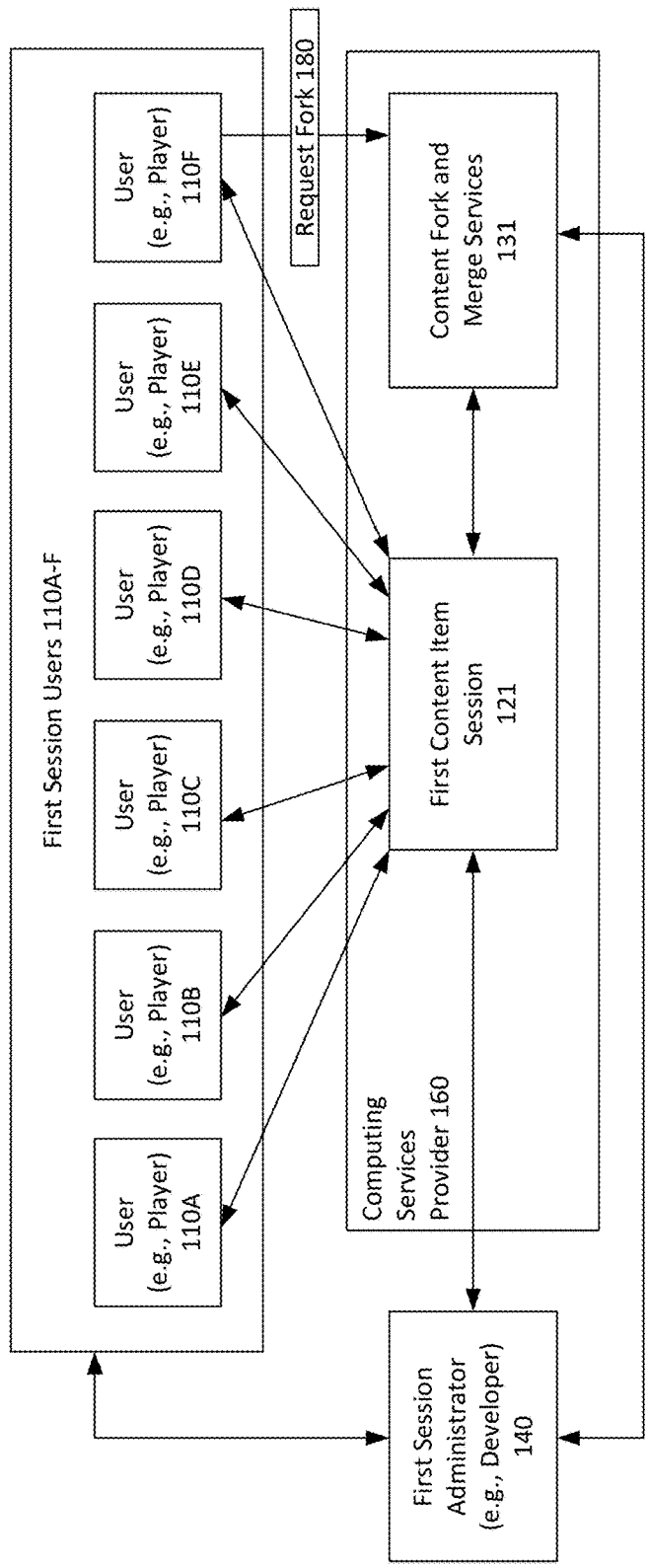
FIG. 1 is a diagram illustrating an example content forking and merging system with a content item session prior to forking that may be used in accordance with the present disclosure.

Techniques for forking and merging of electronically presented content items, such as MMO and other video games, are described herein. In particular, a first content item session may be executed, for example by a computing service provider that hosts execution of content items on behalf of developers or other customers. The first content item session may have a first set of connected users (e.g., players). In some examples, one or more users of the first content item session may request to initiate a forked version of the first content item session. The forked content item session may use at least part of persistence data (e.g., contextual data) from the first content item session, such as data regarding actions performed by players in the first content item session (e.g., battles, kills, accomplishments, movements over time, interactions with other characters and/or objects, acquisition, consumption, generation, and manipulation of goods and resources, etc.). Certain adjustments may, however, also be made to the forked content item session relative to the first content item session. For example, the forked content item session may include only a subset of users from the first content item session or may restrict access to a subset of users (e.g., by inviting specific users to be a part of the forked content item session). In addition to user adjustments, other adjustments to the forked content item session may include adjustments to virtual geography (e.g., a size, shape, and/or location of a virtual world), combat and other rules, character or object types, character or object attributes, time, weather, and many others. Upon generation of the forked content item session, one or more users from the first content item session may be switched into the forked content item session. Additionally, other users may also be gradually added to and/or removed from the forked content item session as desired. In addition to the forked content item session, the first content item session may also continue to execute, with the first and forked content item session evolving in separate directions from one another. Any number of additional content item sessions may also be subsequently forked from the first content item session and/or the forked content item session over time.

The forked content item session may have one or more administrators that serve as the ultimate authority for making certain decisions regarding the forked content item session, such as decisions regarding attributes and features of the forked content item session, dispute resolution between users, teams, etc., regulation of user access, and other decisions. A forked content item session administrator may also be wholly or partly responsible for performing other tasks, such as training, mentorship, handling of technical and/or contextual questions, appointment of other administrators, and others. In some examples, the forked content item session may include one or more administrators that are different from the administrator of the first content item session. In particular, in some cases, the first content item session administrator may be a developer of the first content item session, while the forked content item session administrators may be one or more players or other users of the forked content item session. The forked content item session administrators may, in some examples, be compensated for their time and efforts for serving as administrators, for example based on a flat fee and/or percentage of in-application purchases and other fees paid by users, such as a fee to access the forked content item session. By allowing players and other users to serve as administrators, the described techniques may increase user satisfaction, for example by allowing users to have greater control, influence, and privacy within their game sessions. Furthermore, by compensating these user administrators, they may be rewarded for additional work and effort and motivated to recruit and retain additional users. Moreover, by allowing players and other users to serve as administrators, the described techniques may also provide benefits to developers, for example by reducing the administrative burden and allowing greater focus on game and other content item development.

In some examples, one or more forked or other separate content item sessions may be merged together to form a merged content item session. A merged content item session may, for example, include at least part of the persistence data from each of the separate content item sessions. In some examples, separate content item sessions that are being merged may be compared with one another to determine one or more conflicts, such as inconsistent rules, inconsistent use of resources, virtual locations, and other conflicts. When conflicts between the separate content item sessions are detected, a number of strategies may be employed to resolve such conflicts. For example, in some cases, one or more available conflict resolution strategies may be determined based, at least in part, on the detected conflicts. Indications of the conflicts and the available resolution strategies may then be provided to one or more administrators of the conflicting content item sessions, for example to select or otherwise provide input regarding resulting conflict resolution strategies. Resulting conflict resolution strategies may then be selected and implemented based, at least in part, on the administrator input.

FIG. 1 is a diagram illustrating an example content forking and merging system with a content item session prior to forking that may be used in accordance with the present disclosure. As shown in FIG. 1, a first content item session 121 is executed by computing services provider 160. First content item session 121 may be a session of an electronically presented content item, such as an MMO game or other video game or media item, a business or productivity application, or another content item. Computing services provider 160 may be, for example, a provider that hosts and operates content items on behalf of developers and other customers. In some examples, computing services provider 160 may operate one or more data centers, servers, and/or virtual machine computing components, such as on which content item sessions may be operated. In the example of FIG. 1, first content item session 121 is connected to first session users (e.g., players) 121A-F. As should be appreciated, although six users are shown in FIG. 1, content item session 121 may be connected to any number of different users. First session users 121A-F may connect to computing services provider 160 using one or more communications networks, for example including one or more local area networks (LANs) and/or one or more wide area networks (WANs) such as the Internet.

First content item session 121 is administrated by first session administrator 140, which may be, for example, a game developer or other developer of the first content item session 121. First session administrator 140 may serve as the ultimate authority for making certain decisions regarding first content item session 121, such as decisions regarding attributes and features of the first content item session, dispute resolution between users, teams, etc., regulation of user access, and other decisions. First session administrator 140 may also be wholly or partly responsible for performing other tasks, such as training, mentorship, handling of technical and/or contextual questions, and others.

Computing services provider 160 also operates content fork and merge services 131, which may generally perform various tasks related to forking and merging of content item sessions. As will be described in detail below, these tasks may include operations such as receiving and responding to fork and merge requests, manipulating content item data to generate forked and merged sessions, interacting with and compensating content item session administrators, identifying and resolving conflicts for session mergers, and many others.

In the example of FIG. 1, one of the first session users 110F has issued a request 180 to content fork and merge services 131 to fork the first content item session 121 by generating a second (forked) content item session from the first content item session 121. Content fork and merge services may then process the fork request 180 to generate a second content item session that is forked from the first content item session 121. A forked content item session is a content item session that is generated based, at least in part, on another content item session, such as based on at least part of data associated with the other content item session. Forking may also be referred to as branching. As will be described in detail below, in some examples, fork request 180 may identify one or more of first session users 110A-F that are to be switched to the forked content item session, as well as various other attributes and features that are desired for the forked content item session. In some examples, a forked content item session may use at least part of persistence data (e.g., contextual data) from the first content item session. In particular, during execution of the first content item session 121, first session users 110-A-F may perform various actions to generate and modify persistence data associated with the first content item session 121. For example, first session users 110A-F may move and operate various characters throughout a virtual game world associated with the first content item session 121. These characters may perform various actions, such as engaging in battles and other competitions, killing and injuring other characters, acquiring, consuming, generating, and manipulating goods and resources, building structures, and other actions. As these actions are performed, persistence data for the first content item session 121 may be continually generated and updated in order to reflect the current state of the virtual world. As will be described in detail below, a forked content item session may include at least part of this persistence data, while other portions of the persistence data may be filtered out and/or modified in various ways.

Figure 2:
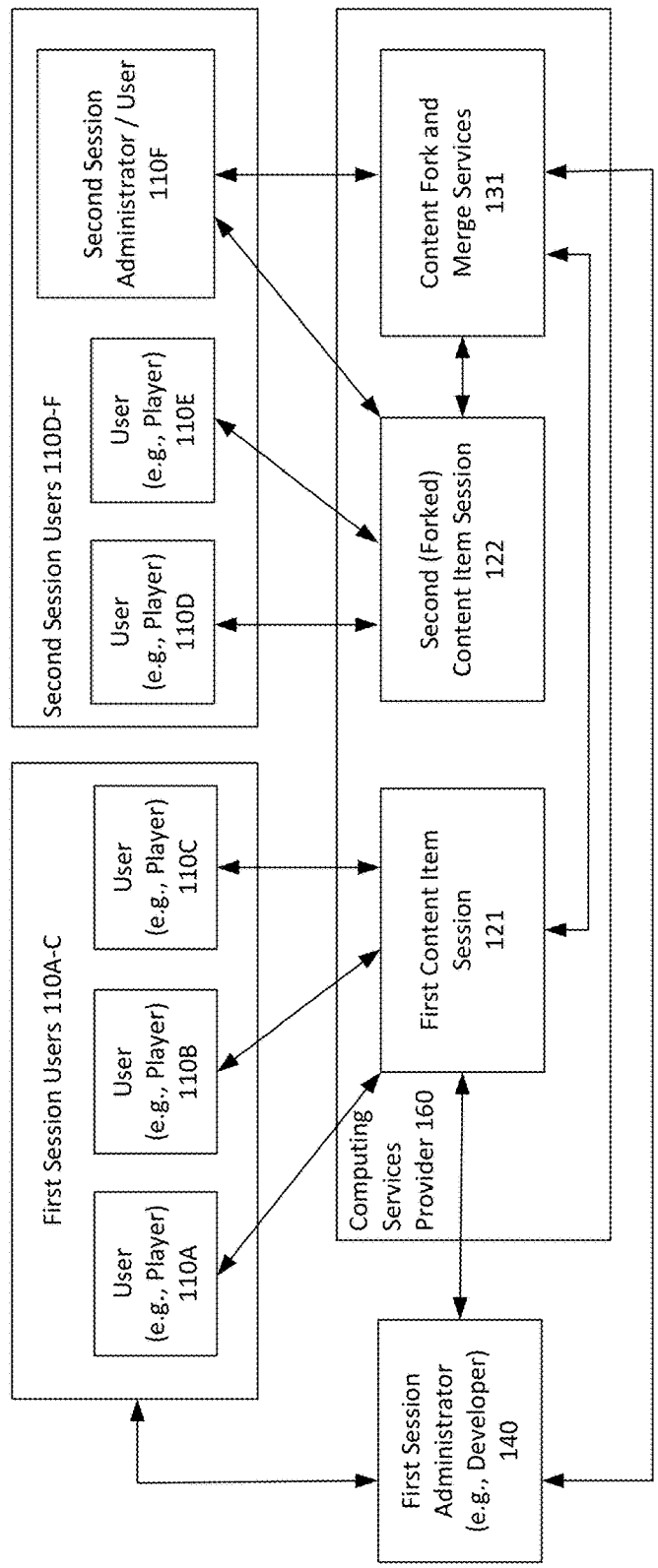
FIG. 2 is a diagram illustrating an example content forking and merging system with a forked content item session that may be used in accordance with the present disclosure.

Referring now to FIG. 2, it is seen that a second (forked) content item session 122 has been generated in response to fork request 180 of FIG. 1. In the example of FIG. 2, second session users 110D-F have been moved from the first content item session 121 to the second content item session 122. By contrast, first session users 110A-C have not been moved to second content item session 122 and remain with first content item session 121. Upon forking and generation of second content item session 122, the first and second content item sessions 121 and 122 may proceed to evolve in separate directions from one another, for example generating and modifying their own separate persistence data based on different user actions and events within the respective content item sessions. In the example of FIG. 2, second (forked) content item session 122 is executed/hosted by the same service provider (i.e., computing service provider 160) that executes/hosts first content item session 121. It is noted however, that the techniques described herein may also be employed in scenarios when a forked content item session is executed by a different service or other entity than the service or entity that executes the content item session from which the forked content item session is forked.

As shown in FIG. 2, user 110F has taken over as the administrator of the second content item session (referred to hereinafter as second session administrator 110F). Second session administrator 110F may serve as the ultimate authority for making certain decisions regarding the second content item session, such as decisions regarding attributes and features of the second content item session, dispute resolution between users, teams, etc., regulation of user access, and other decisions. Second session administrator 110F may also be wholly or partly responsible for performing other tasks, such as training, mentorship, handling of technical and/or contextual questions, appointment of other administrators, and others. In some particular examples, second session administrator 110F may have authority to adjust settings of the second content item session 122, such as game settings. Furthermore, second session administrator 110F may have authority to control which users are included in the set of users associated with the second content item session (e.g., second session users 110D-F). For example, second session administrator 110F may determine which users from the first content item session 121 and/or other users are permitted to join the second content item session 122. Additionally, in some particular examples, second session administrator 110F may appoint one or more other users to become administrators for the second content item session 122.

In some cases, second session administrator 110F may be compensated for his time and effort for serving as an administrator. In some examples, second session administrator 110F may receive one or more payments, for example from computing services provider 160 and/or a developer, for serving as an administrator. The received payments may, for example, be for a particular specified amount (e.g., a flat fee). Also, in some examples, the received payments may be based on a percentage, for example of fees collected from second session users 110D-F for content item features such as in-application purchases, server usage fees, and other fees. Furthermore, in some examples, second session administrator 110F may collect and/or receive fees paid by second session users 110D-F and may then return a portion of these fees, such as a flat fee or percentage, to computing services provider 160 and/or a developer. In some examples, second session administrator 110F may be compensated only a single time or may be compensated multiple times, for example at various intervals throughout a course of execution of the second content item session. In yet other examples, as an alternative or in addition to payments, second session administrator 110F may receive other types of compensation, such as free or reduced in-application purchases and other goods or services that may be provided by computing services provider 160, a developer and/or related entities.

In the example of FIG. 2, both first content item session 121 and second content item session 122 are hosted by computing services provider 160. In some examples, computing services provider 160 may host content on behalf of various customers. For example, in some cases, each customer may lease a respective set of virtual machine instances that are controlled by the associated customer and operated by computing services provider 160 on behalf of the associated customer. A customer may, for example, control its respective set of virtual machine instances through one or more consoles or other interfaces provided by the computing services provider 160 to the customer. Each customer may also, in some examples, have a respective account with the computing services provider 160 with which the customer's respective virtual machine instances are associated.

In some examples, the first content item session 121 may be operated on a first set of virtual machine instances leased by the first session administrator 140. Also, in some examples, when the second content item session 122 is forked from the first content item session 121, the second content item session 122 may be launched and executed on a second set of virtual machine instances leased by the second session administrator 110F. Launching and executing of the second content item session on the second set of virtual machine instances may, in some examples, include moving, migrating, and/or replicating at least part of content item data associated with the first content item session 121 from the first set of virtual machine instances to the second set of virtual machine instances. For example, as will be described in detail below with respect to FIG. 3, the first content item session 121 may have associated content item data, such as a virtual world base definition, configuration data, and persistence data associated with various states. In some examples, at least part of this content item data may be replicated from the first set of virtual machine instances to the second set of virtual machine instances. As also described in detail below, parts of this content item data may be modified, filtered, and/or adjusted for use with the second content item session, for example based on instructions from the second session administrator 110F.

In some cases, when the second (forked) content item session 122 is executed on a set of virtual machine instances leased by the second session administrator 110F, the second session administrator 110F may control those virtual machine instances and the second content item session 122 though one or more consoles and/or accounts associated with the second session administrator 110F. For example, the second session administrator 110F may use an associated console and/or account to manage the second content item session 122 and/or the virtual machine instance(s) on which it executes, for example including inviting and allowing various users to join the second content item session 122, charging fees for users to participate in the second content item session 122, controlling various settings of second content item session 122, and managing other attributes and features. Additionally, even in certain cases when the second content item session is executed by a different service or entity than the first content item session, the second session administrator may also sometimes have one or more consoles and/or accounts with the different service or entity that allow management of the second content item session 122.

Some example techniques for forking of a content item will now be described in detail. In particular, referring now to FIG. 3, example content item data 301A and 301B is shown for a first and a second (forked) content item session, respectively. As shown, first session content item data 301A includes a virtual world base definition 311A, which may include basic information for generating a virtual content item world associated with the first content item session. In some examples, virtual world base definition 311A may be identical or nearly identical for all sessions of a particular content item and may include seed information for generating the virtual world, such as information regarding terrain types (e.g., valleys, hills, cliffs, flat surfaces, rivers, lakes, forests, etc.), virtual objects (e.g., trees, rocks, animals, buildings and other structures), weather, seasons, and other seed information. First session content item data 301A also includes first session configuration data 312A, which may include, for example, options, preferences, rules, and other information associated with the first content item session. For example, first session configuration data 312A may indicate particular rules related to virtual geography, combat and other rules, character types, character attributes, time, weather, and many others. First session content item data 301A also includes first session persistence data 313A. As described in detail above, first session persistence data 313A may include data generated and updated based on actions performed by users of the first content item session, such as engaging in battles and other competitions, killing and injuring other characters, acquiring, consuming, generating, and manipulating goods and resources, building structures, and other actions.

Second (forked) session content item data 301B includes virtual world base definition 311B, second session configuration data 312B, and second session persistence data 313B. In some examples, virtual world base definition 311B may be copied from virtual world base definition 311A, thereby allowing the same seed and other base information to be used for generating the virtual worlds of the first and the second content item sessions. Additionally, second session configuration data 312B may be generated from first session configuration data 312A. However, as shown in FIG. 3, in order to generate second session configuration data 312B, first session configuration data 312A may be modified based, at least in part, on second session feature information 320.

Second session feature information 320 may, in some examples, be provided by one or more administrators of the second content item session, for example to content fork and merge services 131. Second session feature information 320 may generally include indications of various desired features for the second content item session, such as various options, preferences, rules, and other information. For example, second session feature information 320 may include indications of players, teams, guilds, and other users that are to be moved from the first content item session to the second content item session. Second session feature information 320 may also include indications of locations or portions of the virtual world that are to be included in the second content item sessions, such as particular cities, islands, regions, or other locations or areas. For example, the first content item session may be played in a virtual world that corresponds to all of Europe, but the second content item session could be limited to France. Second session feature information 320 may also include indications of particular desired rules for the second content item session, such as combat rules, and rules related to characters, weapons, and other world objects, times, seasons, weather, and many others. For example, while the first content item session may allow players in the same guild to fight and injure one another, this may be prohibited in the second content item session. As another example, certain virtual characters, animals, or objects that are included in the first content item session may be omitted from the second content item session. For example, an administrator could request that the second content item session world includes no cannons, or airplanes or zombies or includes a lesser quantity of trees and fish than are included in the first content item session world. As yet another example, an administrator could request that the second content item session is only played in summer and is only played during the day.

Figure 3:
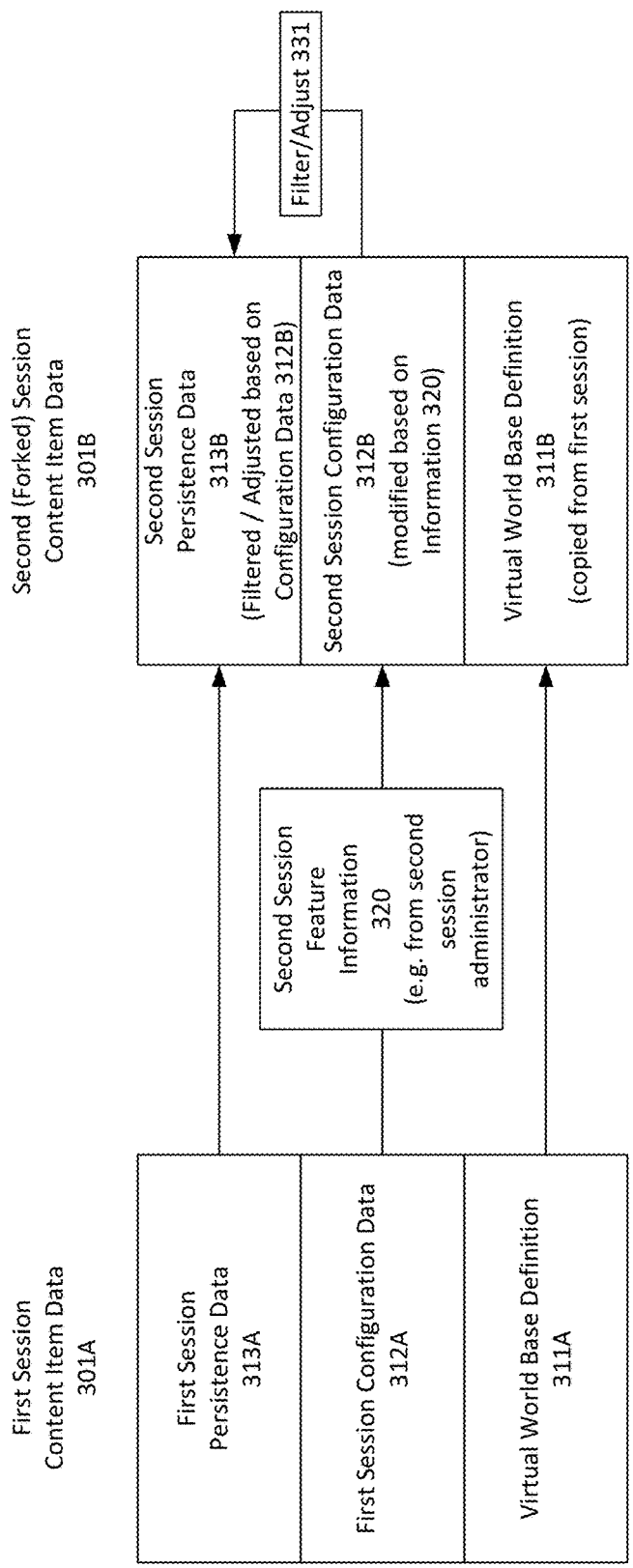
FIG. 3 is a diagram illustrating example content item data associated with a forked content item session that may be used in accordance with the present disclosure.

Thus, as shown in FIG. 3, second session configuration data 312B may be generated by copying and then modifying first session configuration data 312A based, at least in part, on second session feature information 320. As also shown in FIG. 3, second session persistence data 313B may be generated from first session persistence data 313A. In particular, at operation 331, second session persistence data 313B may be generated by filtering (or otherwise adjusting) first session persistence data 313A based, at least in part, on second session configuration data 312B. For example, if the second session configuration data 312B has been modified to be limited to France (as opposed to all of Europe), then second session persistence data 313B may be generated by filtering first session persistence data 313A to remove portions of the data that pertain to European countries other than France. As another example, if the second session configuration data 312B has been modified to remove zombies from the second session virtual world, then second session persistence data 313B may be generated by filtering first session persistence data 313A to remove portions pertaining to zombies.

Accordingly, FIG. 3 provides an example of how second session content item data 301 may be generated based on first session content item data 301A. It is again noted that, subsequent to formation of the second content item session, content item data 301A and 301B may proceed to evolve in separate directions from one another, for example having their own respective persistence data 313A and 313B generated and modified based on different user actions and events within the respective content item sessions.

Figure 4:
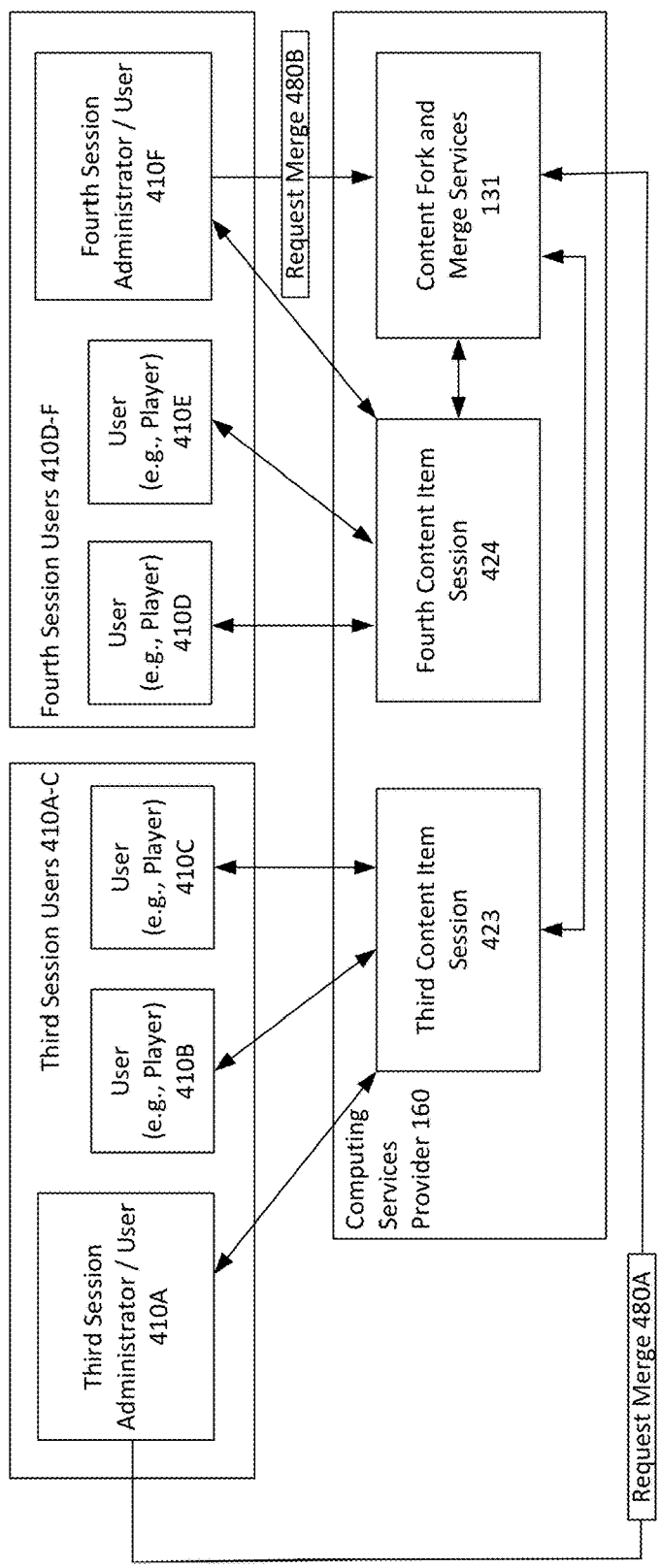
FIG. 4 is a diagram illustrating an example content forking and merging system with separate content item sessions prior to a merger that may be used in accordance with the present disclosure.
Figure 5:
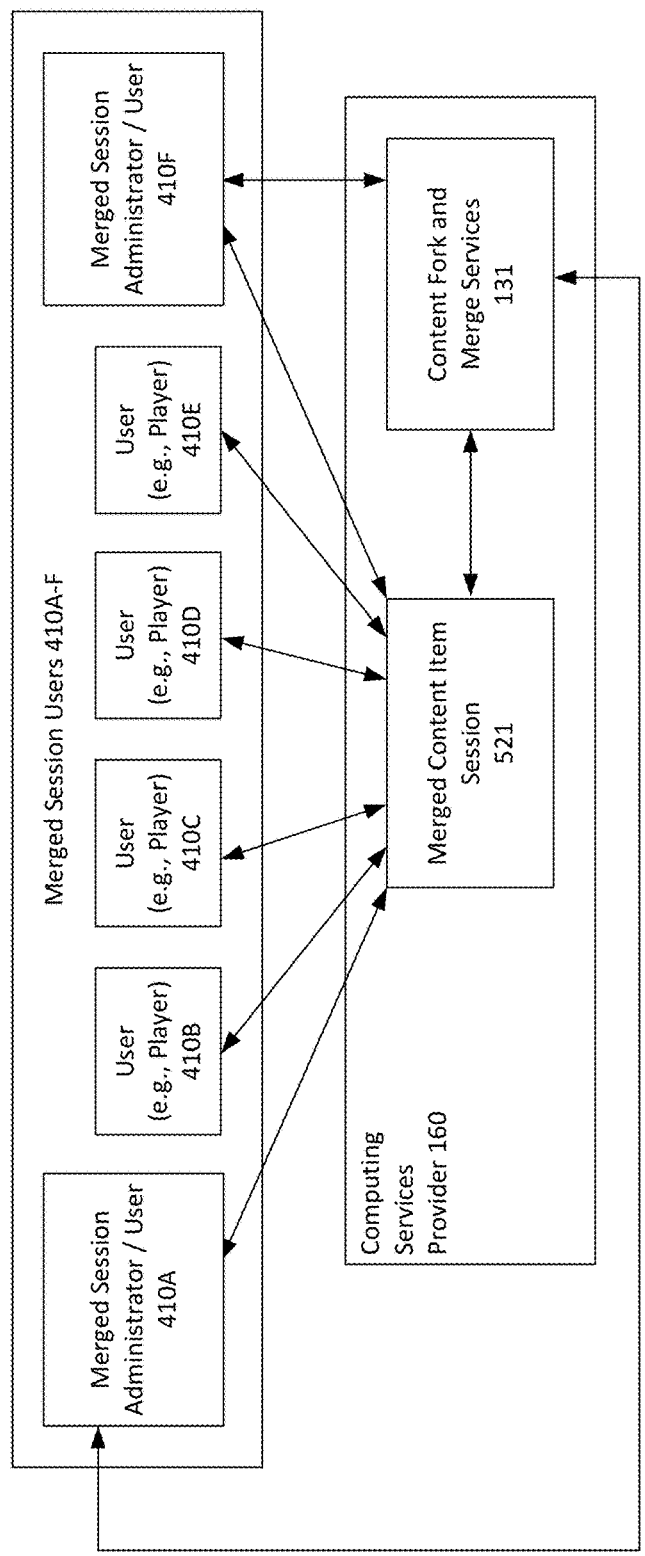
FIG. 5 is a diagram illustrating an example content forking and merging system with a merged content item session that may be used in accordance with the present disclosure.

As set forth above, in addition to forking of content item sessions, the techniques described herein may also allow merger of one or more content item sessions. In particular, referring now to FIG. 4, it is seen that two separate content item sessions, third content item session 423 and fourth content item session 424, may be operated by computing services provider 160. As shown, third content item session 423 is connected to a set of third session users 410A-C. In the example of FIG. 4, user 410A serves as an administrator for the third content item session 423. Additionally, fourth content item session 424 is connected to a set of fourth session users 410D-F. In the example of FIG. 4, user 410F serves as an administrator for the fourth content item session 424. As also shown in FIG. 4, administrators 410A and 410F have issued respective requests 480A and 480B, to content fork and merge services 131, to merge the third and fourth content item sessions 423 and 424. Referring now to FIG. 5, it is seen that, subsequent to issuing and processing of merge requests 480A and 480B, the third and fourth content item sessions 423 and 424 have been merged into a merged content item session 521. As shown in FIG. 5, the third and fourth session users 410A-C and 410D-F from FIG. 4 have been merged into a set of merged session users 410A-F. Additionally, users 410A and 410F, which in FIG. 4 served as the third and fourth session administrators, respectively, serve in FIG. 5 as the merged session administrators.

Figure 6:
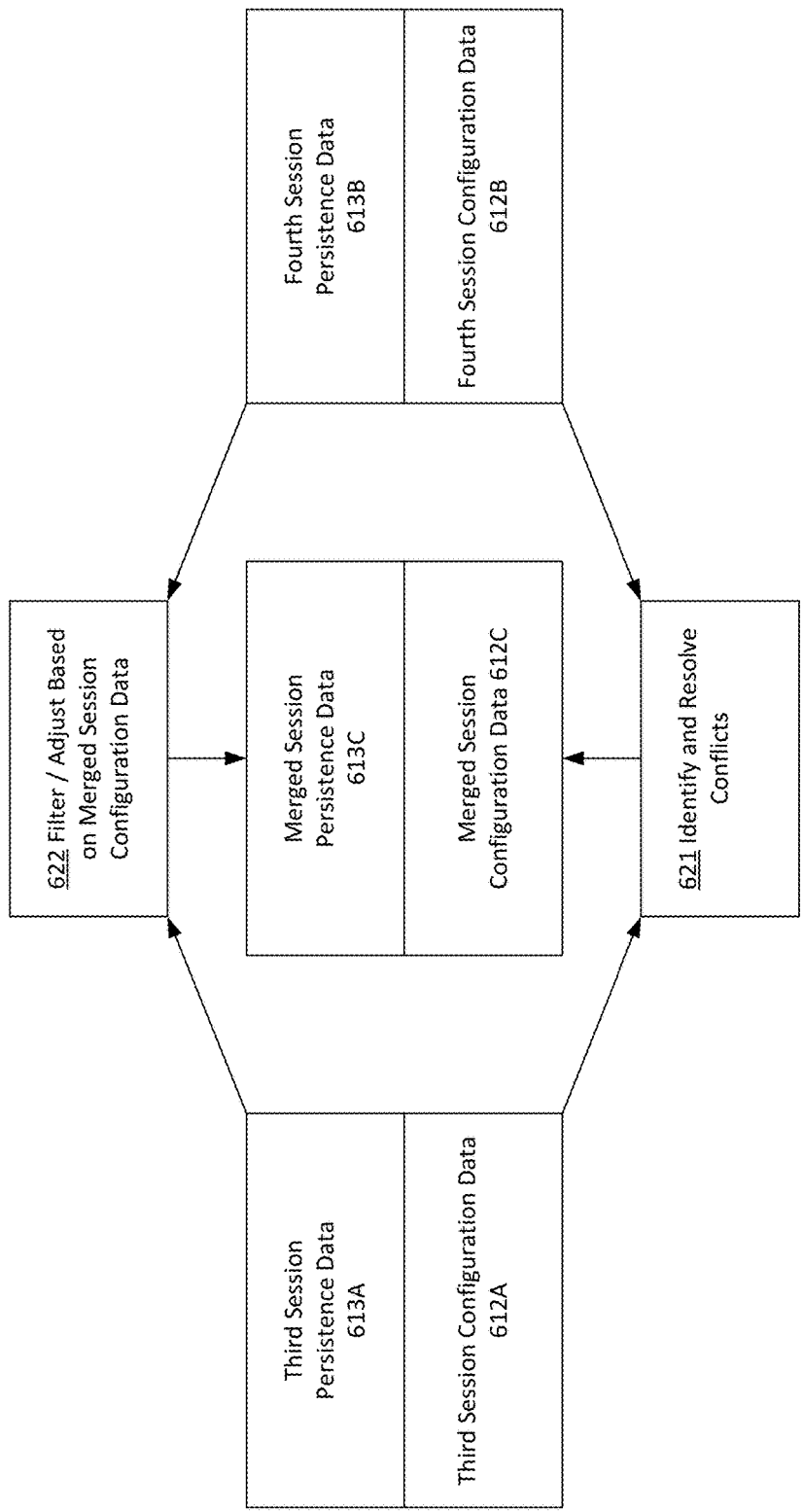
FIG. 6 is a diagram illustrating example content item data associated with a merged content item session that may be used in accordance with the present disclosure.

Referring now to FIG. 6, some example techniques for merging of content item sessions will now be described in detail. In particular, in the example of FIG. 6, third content item session 423 of FIG. 4 has associated third session configuration data 612A and third session persistence data 613A, which are shown on the left side of FIG. 6. Additionally, fourth content item session 424 of FIG. 4 has associated fourth session configuration data 612B and fourth session persistence data 613B, which are shown on the right side of FIG. 6. In the example of FIG. 6, third and fourth session configuration data 612A and 612B may be used to generate merged session configuration data 612C associated with merged content item session 521 of FIG. 5. Additionally, third and fourth session persistence data 613A and 613B may be used to generate merged session persistence data 613C associated with merged content item session 521 of FIG. 5.

In particular, as indicated by operation 621, merged session configuration data 612C may be generated, at least in part, by comparing the third and fourth session configuration data 612A and 612B and identifying and resolving conflicts between them. In some examples, conflicts may occur between configuration data for merged content item sessions when, for example, rules, preferences, options, and other features of the sessions' respective configuration data are at least partially mutually exclusive and/or may result in inconsistencies. In some examples, conflicts may be caused by at least a partial overlap in the virtual worlds of each merged content item session. For example, consider the scenario in which, in third content item session 423, a first team has occupied and built a fort at a particular virtual location. Now suppose that, in fourth content item session 424, a second team has occupied and built a factory at the same virtual location. This scenario may lead to conflicts, for example because the fort and the factory cannot occupy the same location in the merged world. In other examples, conflicts may result from inconsistent rules and/or options in the merged content item sessions. For example, consider the scenario in which third content item session 423 permits zombies in its virtual world but fourth content item session 424 has excluded zombies from its virtual world. As another example, consider the scenario in which third content item session 423 permits players on the same team to fight and injure one another but fourth content item session 424 has prohibited this. In some examples, these and other scenarios may lead to conflicts in configuration data for merged content item sessions.

In some examples, when separate content item sessions are being merged, content fork and merge services 131 may examine configuration data from the separate content item sessions to identify conflicts between the respective content item sessions. Content fork and merge services 131 may then, for example, determine, based at least in part on the identified conflicts, one or more available conflict resolution schemes for resolving those conflicts. Some example conflict resolution schemes may include, for example, prioritizing particular content item sessions relative to one another and resolving conflicts based on those priorities, assigning higher priorities to content item sessions within virtual areas that are included in their virtual worlds, assigning priorities to content item sessions based on quantities of users, session duration, user accomplishments, fees or other compensation from session users, and other factors, averaging or otherwise blending conflicting quantitative values between content items, resolving conflicts based on administrator and/or user input or selection, resolving conflicts randomly, and many others. In some examples, for virtual areas that overlap in merging content item sessions, these virtual areas may be divided into a number of finer granularity sub-areas in order to attempt to allow changes that were made in both content item sessions to be captured in the merged content item session. For example, if a first sub-area was modified (e.g., by building a structure, chopping down trees, etc.) in the third content item session 423 but not in the fourth content item session 424, then priority for the first sub-area could be given to the third content item session 423 in order to allow the modifications from the third content item session 423 to be included in the merged content item session 521. By contrast, if a second sub-area was modified in the fourth content item session 424 but not in the third content item session 423, then priority for the second sub-area could be given to the fourth content item session 424 in order to allow the modifications from the fourth content item session 424 to be included in the merged content item session 521.

In some cases, upon identifying conflicts and determining one or more available conflict resolution schemes, content fork and merge services 131 may provide indications of the conflicts and available resolution schemes to administrators of content item sessions that are being merged. In some examples, these administrators may then provide various selections, agreements, or other inputs for resolving the conflicts. For example, in some cases, the administrators may select one or more conflict resolution schemes and/or may resolve the conflicts between themselves. It is noted that, in some examples, when a conflict occurs between two or more content item sessions, the administrators for each session involved in the conflict may be required to agree on a selected resolution before that resolution is permitted to be implemented in the merged session. Content fork and merge services 131 may then, based on the administrator input, resolve conflicts and modify and combine third and fourth session configuration data 612A and 612B to form merged session configuration data 612C.

As also shown in FIG. 6, at operation 622, third and fourth session persistence data 613A and 613B are filtered or otherwise adjusted based, at least in part, on merged session configuration data 612C, and combined to form merged session persistence data 613C. For example, consider the scenario in which third content item session 423 permits zombies in its virtual world but fourth content item session 424 has excluded zombies from its virtual world. Now suppose that, in the merged content item session 521, a decision is made to prohibit zombies. In this example, when forming merged session persistence data 613C, third content item session persistence data 613A may be filtered to remove portions that pertain to zombies. As another example, suppose that, in the merged content item session 521, a decision is made to allow zombies in a first portion of the merged virtual world but to prohibit zombies in a second portion of the merged virtual world. In this example, when forming merged session persistence data 613C, third content item session persistence data 613A may be filtered to remove portions that pertain to zombies in the second portion of the merged virtual world. As yet another example, consider the scenario in which third content item session 423 prohibits cannons in its virtual world but fourth content item session 424 has allowed cannons in its virtual world. Now suppose that, in the merged content item session 521, a decision is made to prohibit cannons. In this example, when forming merged session persistence data 613C, fourth content item session persistence data 613B may be filtered to remove portions that pertain to cannons.

It is noted that, in some examples, persistence data that is filtered out from one or both of the merged content item sessions may be saved for subsequent use. For example, in some cases, persistence data pertaining to cannons may that is filtered out from fourth content item session persistence data 613B may be saved. Subsequently, if the rules of the merged content item session are changed to allow cannons, then the saved persistence data pertaining to cannons may be added in to merged session persistence data 613C, thereby allowing cannons that were used, acquired, or otherwise included within the fourth content item session 424 to be re-introduced into the merged content items session 521.

In addition to the data and operations shown in FIG. 6, it is noted that the merged content item session 521 may also, in some examples, be formed by copying a virtual world base definition, which may, in some examples, be shared by both the third and fourth content item sessions 423 and 424. The copying of a virtual world base definition is described in detail above, for example with respect to FIG. 3, and is not repeated here.

Figure 7:
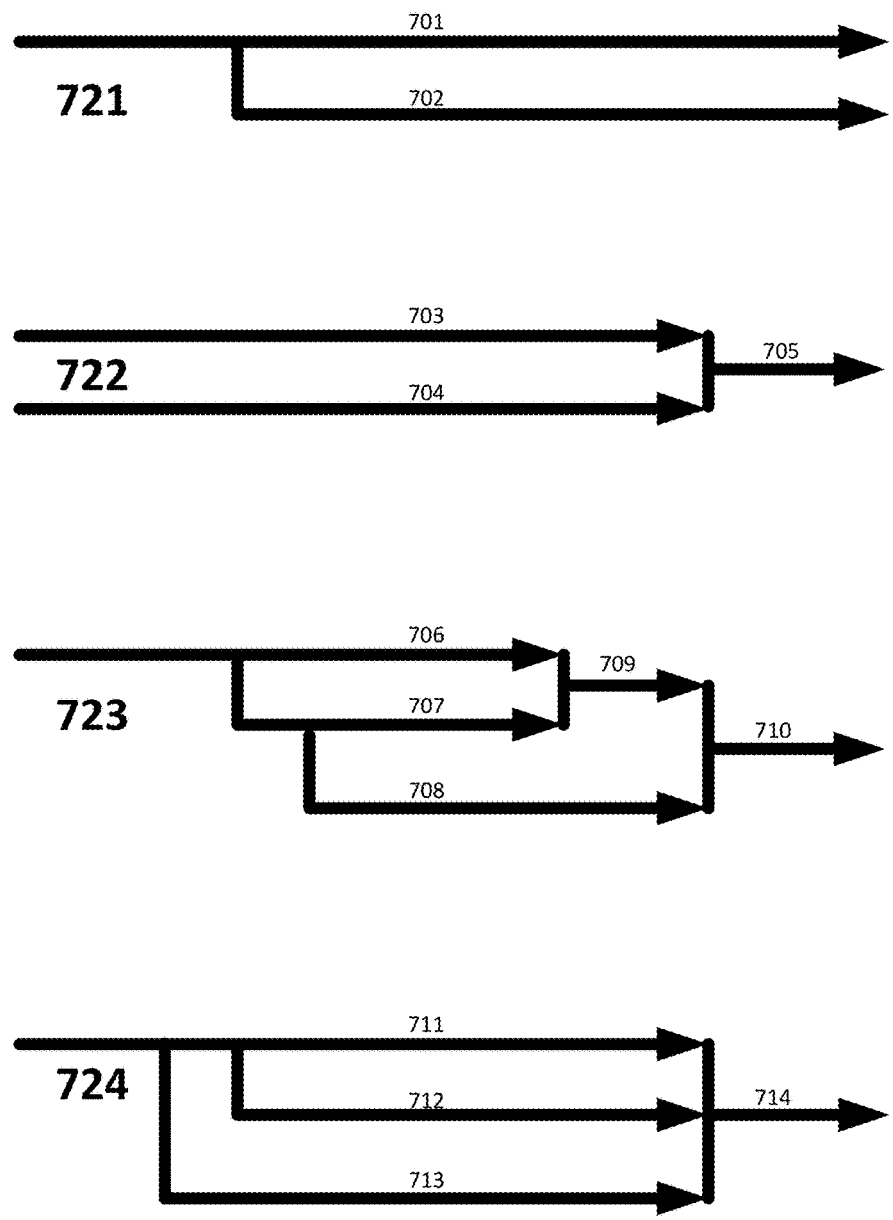
FIG. 7 is a diagram illustrating example forked and merged content item timelines that may be used in accordance with the present disclosure.

Referring now to FIG. 7, some example timelines for merged and forked content item sessions will now be described in detail. For example, a first timeline 721 shows an example in which a first content item session 701 is executed and is then forked to generate a second content item session 702. Content item sessions 701 and 702 do not perform any subsequent forks or merges and continue to execute separately until they eventually expire. A second timeline 722 shows an example in which a first content item session 703 and a second content item session 704 execute separately and are then subsequently merged to generate a third merged content item session 705. Content item session 705 does not perform any subsequent forks or merges and continues to execute until it eventually expires. A third timeline 723 shows an example in which a first content item session 706 is executed and is then forked to generate a second content item session 707. Content item session 707 is then, in turn, forked to generate a third content item session 708. Content item sessions 706 and 707 are then subsequently merged to generate a fifth merged content item session 709. Content item sessions 708 and 709 are then, in turn, merged to generate a sixth merged content item session 710. Content item session 710 does not perform any subsequent forks or merges and continues to execute until it eventually expires. A fourth timeline 724 shows an example in which a first content item session 711 is executed and is then forked to generate a second content item session 713. Content item session 711 is then forked again to generate a third content item session 712. Content item sessions 711, 712 and 713 are then subsequently merged to generate a fourth merged content item session 714. Content item session 714 does not perform any subsequent forks or merges and continues to execute until it eventually expires. As should be appreciated, FIG. 7 is merely intended to depict some non-limiting examples of how content item sessions may be forked and merged, and many other different timelines having different combinations of forking and merging operations may be employed in accordance with the disclosed techniques.

In some examples, forking and merging of content item sessions may be performed more efficiently by, for example, implementing an actor-based model for performance of various computations associated with the forked and merged content item sessions. Each actor may be a computational unit that is responsible for maintaining a respective associated state. In some examples, actors may be computational units to which messages may be addressed, and the actors may receive and process the messages in order to maintain and update their respective states. Actors may also be capable of addressing and sending messages to other actors. For example, in some cases, one or more actors may be responsible for performing computations relating to various objects throughout a virtual world or portions of a virtual world. In one specific example, certain actors may be assigned to handle various portions of a virtual world and to track virtual objects that move in and out of their assigned portions of the virtual world. Some examples of an actor-based model for performing various computations in association with a virtual space are described in U.S. patent application Ser. No. 14/827,882, entitled "AREA OF INTEREST SUBSCRIPTION," filed on Aug. 17, 2015, the entirety of which is hereby incorporated by reference. Also, in some examples, actors handling different virtual worlds and/or portions of virtual worlds may execute on the same and/or different servers and/or virtual machines. As set forth above, in some examples, when a content item is forked or merged, players may be re-assigned to different virtual worlds and/or portions of virtual worlds. In these examples, the actor-based model may improve efficiency by, for example, allowing players to move between virtual worlds and/or portions of virtual worlds without necessarily requiring a movement between servers and/or virtual machines, but rather by merely modifying a set of actors that the player communicates with. For example, if, as a result of fork or merge, a player is moved from Paris to London, then the player may simply be re-assigned to switch communications from one or more actors responsible for computations associated with Paris to one or more actors responsible for computations associated with London.

Figure 8:
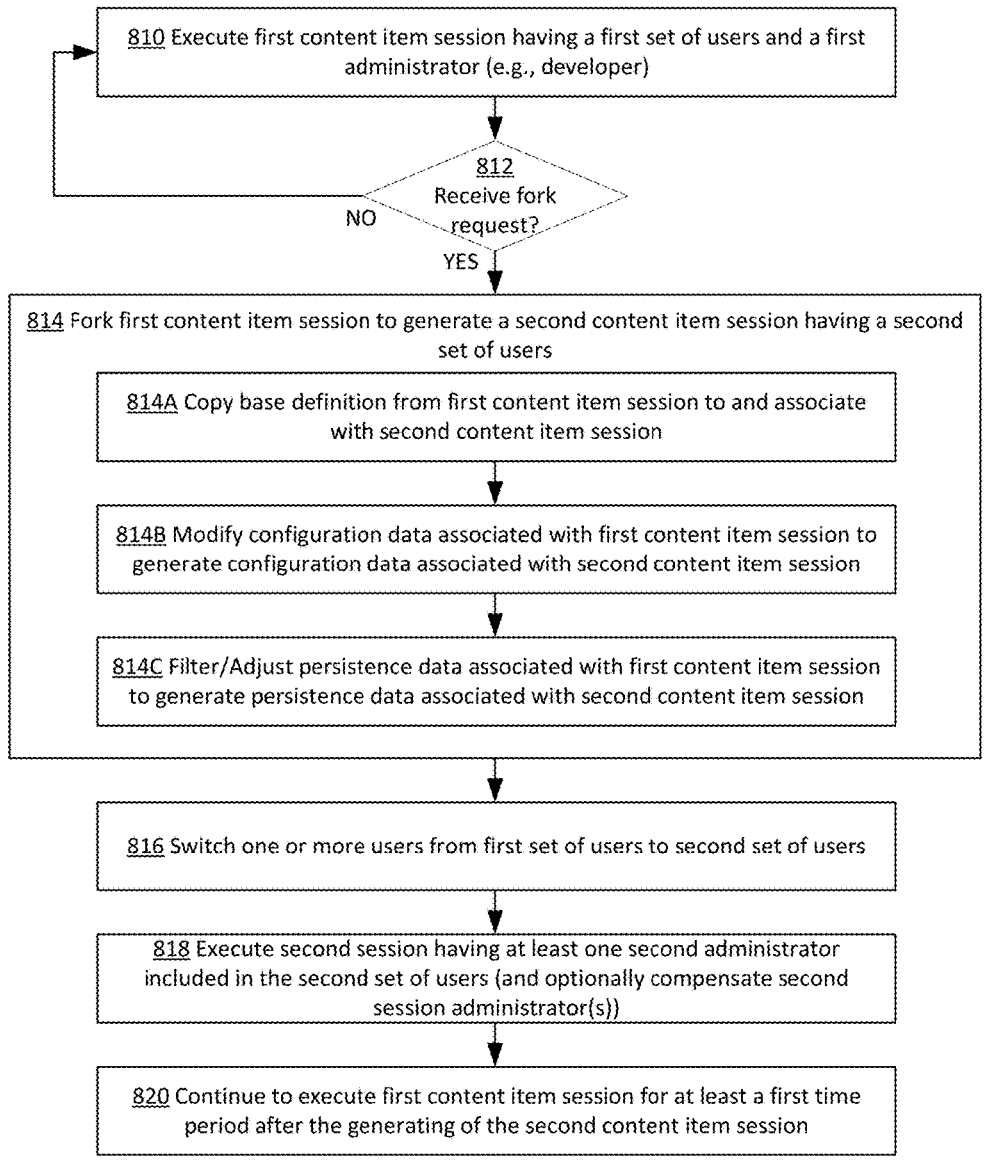
FIG. 8 is a flowchart illustrating an example process for content item session forking that may be used in accordance with the present disclosure.

Some example processes for content item operation, including forking and merging, will now be described in detail. In particular, FIG. 8 is a flowchart illustrating an example process for content item session forking that may be used in accordance with the present disclosure. As shown, the process of FIG. 8 is initiated at operation 810, at which a first content item session is executed. As set forth above, the first content item session has a first set of users and a respective first administrator, such as a game developer or other content item developer. At operation 812, it is determined whether a request for forking of the first content item session is received. As set forth above, in some examples, the fork request may be issued by one or more players or other users of the first content item session. For example, a group of users participating in an MMO or other video game may sometimes wish to generate their own separate forked world in which they have greater privacy, control, flexibility, etc. When no fork request is detected, the process loops back to operation 810.

When a fork request is detected, the process proceeds to operation 814, at which the first content item session is forked to generate a second (forked) content item session having a respective second set of users. As set forth above, the second content item session may use at least part of persistence data (e.g., contextual data) from the first content item session. In some examples, the forking of the first content item session may include sub-operations 814A-C. In particular, at sub-operation 814A, a base definition of the first content item session is copied and associated with the second content item session. As set forth above, a base definition may include seed information for generating a virtual world, such as information regarding terrain types (e.g., valleys, hills, cliffs, flat surfaces, rivers, lakes, forests, etc.), virtual objects (e.g., trees, rocks, animals, buildings and other structures), weather, seasons, and other seed information.

At sub-operation 814B, configuration data associated with the first content item session is modified to generate configuration data associated with the second content item session. As set forth above, configuration data may include, for example, options, preferences, rules, and other information associated with the a respective content item session. Also, in some examples, a user that requests the forking or another party may provide second session feature information indicating various settings, such as options, preferences, rules, and other features that are desired for the second content item session. For example, the second session administrator may have authority to adjust settings of the second content item session. In some examples, settings of the content item session may include one or more adjustments relative to the first content item session, such as adjustments with respect to a size, shape, or location of a virtual world, combat or other rules, time, seasons, weather, weapons, character or object types, or character or object attributes, and/or other adjustments. As described in detail above, the configuration data associated with the first content item session may be modified based, at least in part, on the second session feature information, in order to generate the configuration data associated with the second session. Settings of the second content item session may also, in some examples, be adjusted at any point throughout operation of the second content item session.

At sub-operation 814C, persistence data associated with the first content item session is filtered or otherwise adjusted to generate persistence data associated with the second content item session. In some examples, the first session persistence data may be filtered or otherwise adjusted based, at least in part, on the second session configuration data in order to generate the second session persistence data. As set forth above, for example, if the second session configuration data has been modified to be limited to France (as opposed to all of Europe), then the second session persistence data may be generated by filtering the first session persistence data to remove portions of the data that pertain to European countries other than France. As another example, if the second session configuration data has been modified to remove zombies from the second session virtual world, then the second session persistence data may be generated by filtering the first session persistence data to remove portions pertaining to zombies.

At operation 816, one or more users are switched from the first set of users to the second set of users. In some examples, the switched users may be identified and/or approved by an administrator of the second content item session. In some examples, the switched users may include at least one user, such as a second session administrator, that issues a fork request based, at least in part, upon which the second content item session is generated. Also, in some examples, the switched users may include users from one or more teams or guilds that wish to separate into the forked content item session. As set forth above, in some examples, an actor-based model may be employed for execution of forked and merged content item sessions, and operation 816 may include re-assigning the one or more users from communicating with one or more actors associated with the first content item session to communicating with one or more actors associated with the second content item session.

At operation 818, the second content item session is executed. The second content item session may have at least one respective second administrator that is included in the second set of users of the second content item session. The second administrators may perform various tasks related to the second content item session, such as user dispute resolution, regulation of user access, forking and merging determinations, appointment of other administrators for the second content item session, and many others. As set forth above, users that serve as second session administrators may, in some examples, receive compensation in exchange for serving as administrators, for example based on a flat fee and/or percentage of in-application purchases and other fees paid by users. In some examples, the second session administrators may be compensated only a single time or may be compensated multiple times, for example at various intervals throughout the course of execution of the second content item session. By allowing players and other users to serve as administrators, the described techniques may increase user satisfaction, for example by allowing users to have greater control, influence, and privacy within their game sessions. Furthermore, by compensating these user administrators, they may be rewarded for additional work and effort and motivated to recruit and retain additional users.

At operation 820, the execution of the first content item session is continued for at least a first time period after the generating of the second content item session. As set forth above, after being forked, the first and the second content items may proceed to evolve in separate directions from one another, for example adding and removing respective users and having their own respective persistence data generated and modified based on different user actions and events within the respective content item sessions.

Figure 9:
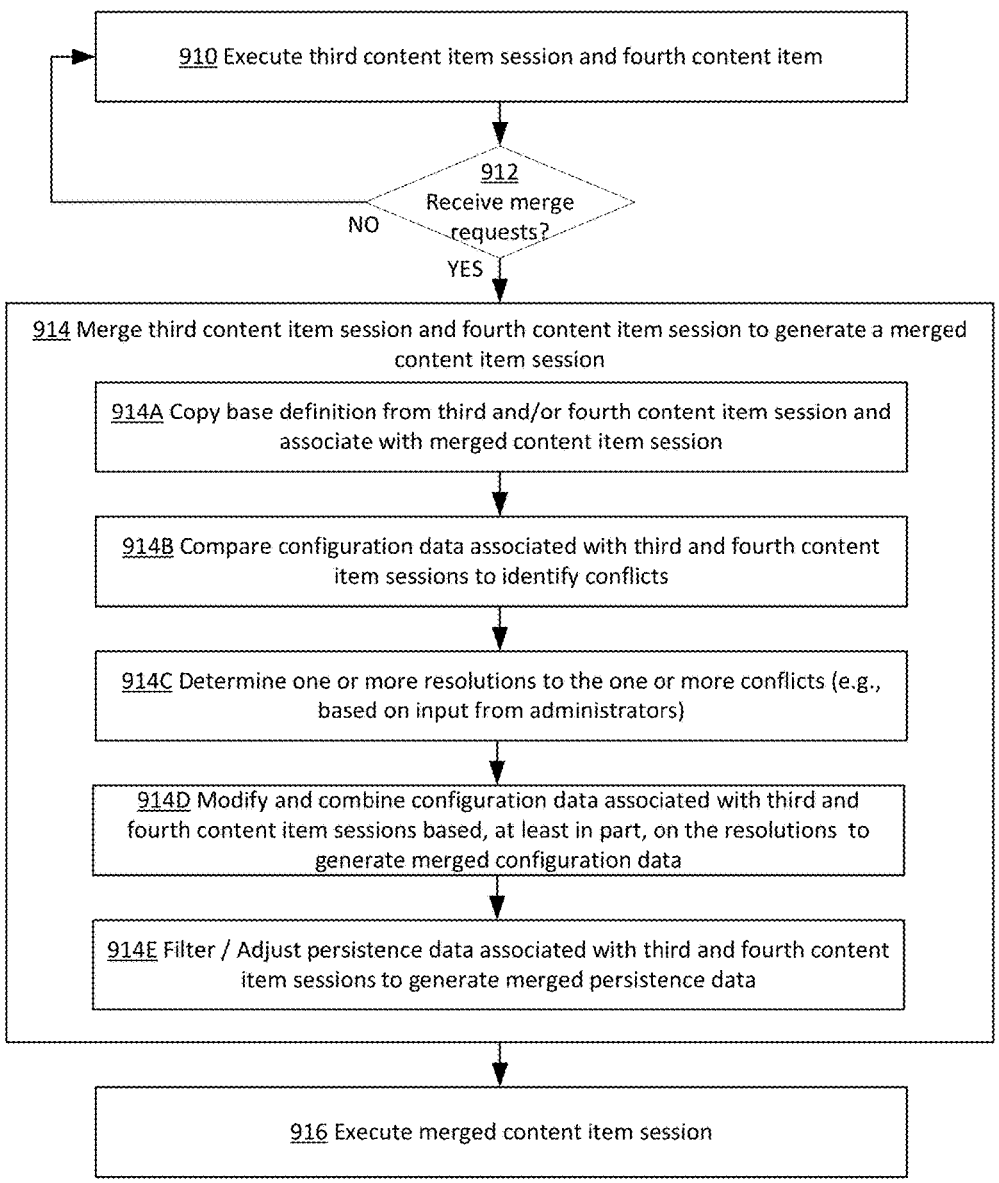
FIG. 9 is a flowchart illustrating an example process for content item session merging that may be used in accordance with the present disclosure.

FIG. 9 is a flowchart illustrating an example process for content item session merging that may be used in accordance with the present disclosure. It is noted that, while the example of FIG. 9 describes a merger of two content item sessions, the techniques described herein may be employed to merge any number of different content item sessions. As shown, the process of FIG. 9 is initiated at operation 910, at which third and fourth content item sessions are executed. The third and fourth content item sessions, in this context, may include the first and/or second content item sessions from FIG. 8 or may be other content item sessions. As set forth above, the third and fourth content item sessions may each have their own respective sets of users and administrators. At operation 912, it is determined whether requests for merging of the third and the fourth content item sessions are received. In some examples, in order to proceed with a merger of content item sessions, merge requests may be required to be received, or otherwise approved, by administrators of each of the content item sessions being merged. When such merge requests are not received, the process loops back to operation 910.

When merge requests are received, the process proceeds to operation 914, at which the third and the fourth content item sessions are merged to generate a merged content item session. In some examples, the merging of the third and the fourth content item sessions may include sub-operations 914A-E. In particular, at sub-operation 914A, a base definition of the third and/or fourth content item session is copied and associated with the merged content item session. At sub-operation 914B, configuration data associated with the third and the fourth content item session are compared to identify one or more conflicts. As set forth above, in some examples, conflicts may occur when separate content item sessions include at least partially inconsistent rules, use of resources, use of virtual locations, and for other reasons. Many examples of conflicts within content item session configuration data are described in detail above and are not repeated here.

At sub-operation 914C, one or more resolutions to the one or more conflicts are determined. In some examples, the resolutions may be determined based on the detected conflicts, such as based on the quantity, scope, importance, or other attributes of the detected conflicts. Many example conflict resolution schemes are described in detail above and are not repeated here. In some examples, the conflict resolutions may be determined based, at least in part, on input provided by administrators of the third and fourth content item sessions. For example, in some cases, indications of conflicts and available resolutions may be provided to administrators of the third and fourth content item sessions. Based on this information, the administrators of the third and fourth content item sessions may then select one or more resolutions for one or more conflicts or otherwise provide input for resolving the conflicts.

At sub-operation 914D, configuration data associated with the third and the fourth content item sessions is modified and combined based, at least in part, on the one or more resolutions, to generate configuration data associated with the merged content item session. For example, consider the scenario in which the third session configuration data included a rule permitting zombies and the fourth session configuration data included a rule prohibiting zombies. In some examples, the third and fourth session administrators may confer amongst themselves and determine that zombies will not be permitted in the merged world. In this example, the resulting merged configuration data may include the rule from the fourth session configuration data that prohibits zombies as opposed to the rule from the third session configuration data that allows zombies.

At sub-operation 914E, persistence data associated with the third and the fourth content item sessions is filtered or otherwise adjusted and combined based, at least in part, on the merged session configuration data to generate persistence data associated with the merged content item session. In particular, as described in the above example, zombies may be permitted in the third content item session but may be prohibited in the merged content item session. In this example, when forming merged session persistence data, the third content item session persistence data may be filtered to remove portions that pertain to zombies.

At operation 916, the merged content item session is executed. The merged content item session may, in some examples, include all, or any portions of, the users and/or administrators, from each of the third and fourth content item sessions. Upon being merged, the merged content item session may then subsequently be forked into and/or merged with any number of other content item sessions.

In some examples, statistics regarding content item sessions may be collected, for example by a service that hosts the content item sessions such as computing services provider 160. These statistics may include information such as a quantity of users, a size and/or location of an associated virtual world, information about various battles (e.g., quantity of participants, weapons, locations, rules, etc.), information about quantity, location, etc. of structures or other virtual objects or resources, and many other types of information. This statistical information may, for example, be provided to administrators of the content item sessions, for example using one or more service consoles available to the administrators, to assist in making various decisions, such as whether to add users, changes settings, or merge with other content item sessions. In some examples, one or more administrators may be permitted to access statistical information about other content item sessions that they are not currently involved with. This may allow the administrators to make more informed decisions about merging with the other content item sessions. For example, if a first administrator of a first content item session notices that a second content item session has a small quantity of players, the first administrator may, in some cases, want to approach a second administrator of the second content item session about merging. In some examples, the first and second administrators could then use a service console to communicate with one another and with their respective users regarding merging.

Figure 10:
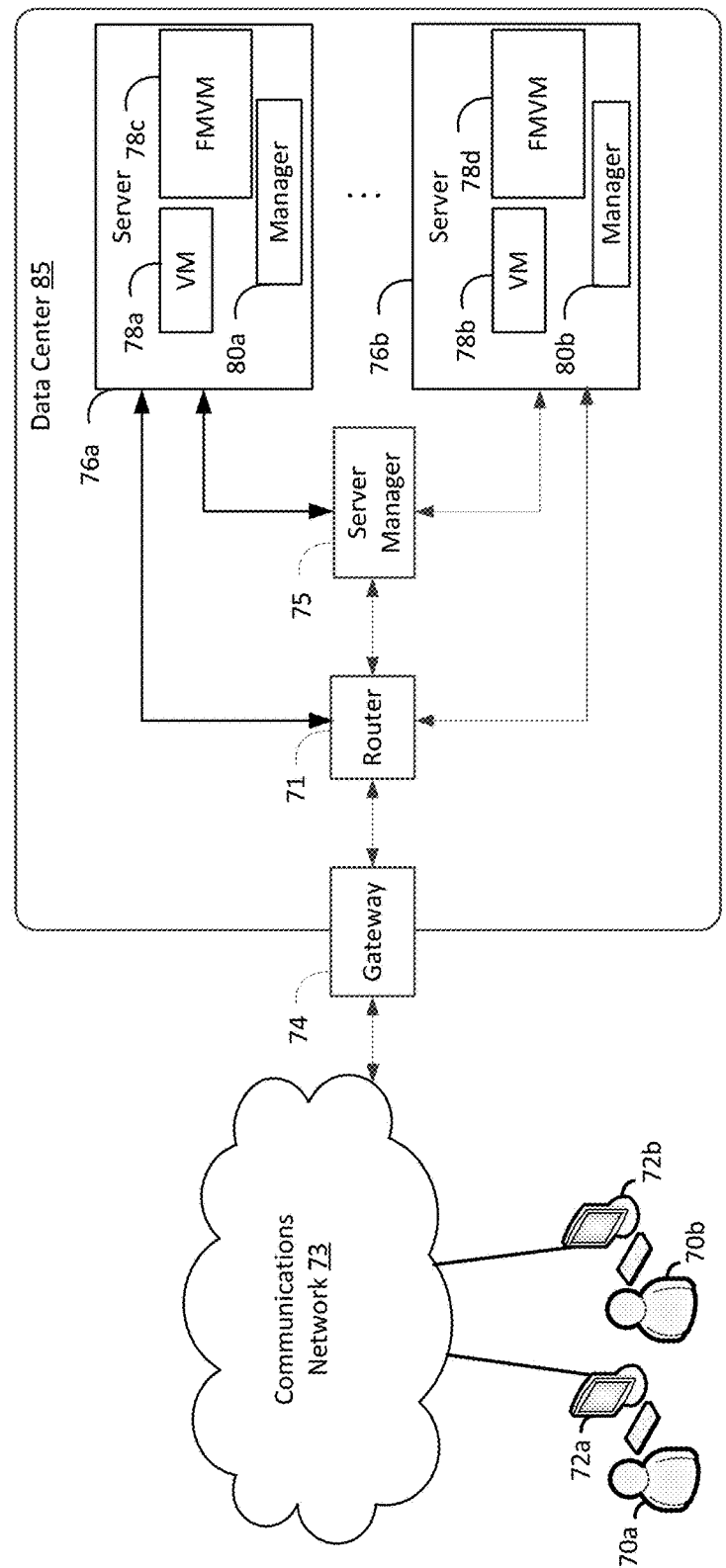
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are forking and merging virtual machine ("FMVM") instances. The FMVM virtual machine instances 78c and 78d may be configured to perform all, or any portion, of the content item session forking and merging techniques and/or any other of the disclosed techniques in accordance with the present disclosure and described in detail above. As should be appreciated, while the particular example illustrated in FIG. 10 includes one FMVM virtual machine in each server, this is merely an example. A server may include more than one FMVM virtual machine or may not include any FMVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
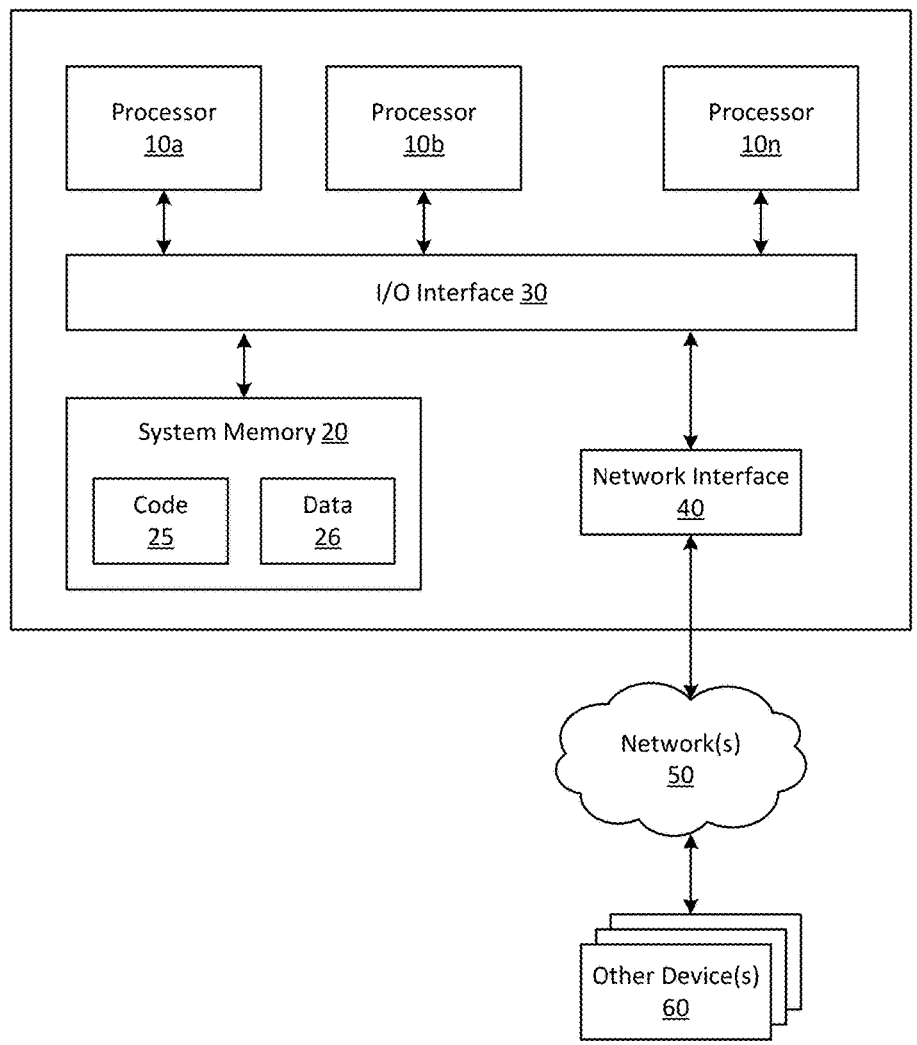
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for video game operation comprising:
   one or more processors; and
   one or more memories having stored therein instructions that, upon execution by the one or more processors, cause the computing system perform operations comprising:
      executing a first video game session having a first administrator and a first set of players;
      forking the first video game session to result in generating of a second video game session having a second set of players, wherein the forking comprises:
         modifying first configuration data associated with the first video game session to generate second configuration data associated with the second video game session; and
         filtering, based at least in part on the second configuration data, first persistence data associated with the first video game session to generate second persistence data associated with the second video game session, wherein the second video game session uses the second persistence data;
      executing the second video game session, wherein the second video game session has at least one second administrator that is included in the second set of players, wherein the at least one second administrator has authority to adjust game settings of the second video game session and control which players are included in the second set of players; and
      continuing to execute the first video game session for at least a first time period after the generating of the second video game session.

2. The computing system of claim 1, wherein the forking the first video game session further comprises:
   copying a base definition associated with the first video game session and associating the base definition with the second video game session.

3. The computing system of claim 1, wherein the operations further comprise merging the second video game session with another video game session to generate a merged video game session.

4. The computing system of claim 1, wherein the at least one second administrator that is included in the second set of players receives compensation in exchange for serving as an administrator.

5. A computer-implemented method for content item session operation comprising:
   executing a first content item session having a first administrator and a first set of users;
   generating, based at least in part on the first content item session, a second content item session having a second set of users, wherein the generating comprises:
      modifying first configuration data associated with the first content item session to generate second configuration data associated with the second content item session; and
      filtering, based at least in part on the second configuration data, first persistence data associated with the first content item session to generate second persistence data associated with the second content item session, wherein the second content item session uses the second persistence data;
   switching one or more users from the first set of users to the second set of users, wherein the generating is based at least in part on a request by at least one of the one or more users that is switched from the first set of users to the second set of users;
   executing the second content item session, wherein the second content item session has at least one second administrator that is included in the second set of users, wherein the at least one second administrator has authority to adjust settings of the second content item session; and
   continuing to execute the first content item session for at least a first time period after the generating of the second content item session.

6. The computer-implemented method of claim 5, wherein the first content item session is a massively multiplayer online (MMO) video game session.

7. The computer-implemented method of claim 5, wherein the generating further comprises:

copying a base definition associated with the first content item session and associating the base definition with the second content item session.

8. The computer-implemented method of claim 5, wherein the settings of the second content item session include one or more adjustments relative to the first content item session with respect to at least one of a size, shape, or location of a virtual world, combat or other rules, time, seasons, weather, weapons, character or object types, or character or object attributes.

9. The computer-implemented method of claim 5, wherein the switching the one or more users from the first set of users to the second set of users comprises re-assigning the one or more users from communicating with one or more actors associated with the first content item session to communicating with one or more actors associated with the second content item session.

10. The computer-implemented method of claim 5, wherein the at least one second administrator that is included in the second set of users receives compensation in exchange for serving as an administrator.

11. The computer-implemented method of claim 5, wherein the at least one second administrator that is included in the second set of users performs at least part of at least one of user dispute resolution, regulation of user access, forking and merging determinations, or appointment of other administrators for the second content item session.

12. The computer-implemented method of claim 5, further comprising merging the second content item session with an other content item session to generate a merged content item session.

13. The computer-implemented method of claim 12, wherein the merging comprises:
    comparing the second configuration data associated with the second content item session with other configuration data associated with the other content item session to identify one or more conflicts;
    determining one or more resolutions to the one or more conflicts;
    modifying and combining, based at least in part on the one or more resolutions, the other configuration data and the second configuration data to generate third configuration data associated with the merged content item session; and
    filtering and combining, based at least in part on the third configuration data, the second persistence data associated with the second content item session and other persistence data associated with the other content item session to generate third persistence data associated with the merged content item session.

14. The computer-implemented method of claim 13, wherein the determining the one or more resolutions to the one or more conflicts is based, at least in part, on input provided by the at least one second administrator and at least one other administrator of the other content item session.

15. One or more non-transitory computer-readable storage media having stored thereon instructions that, upon execution by one or more computing devices, cause the one or more computing devices to perform operations comprising:
    executing a first content item session having a first administrator and a first set of users;
    branching the first content item session to result in generating of a second content item session having a second set of users, wherein the branching comprises:
        modifying first configuration data associated with the first content item session to generate second configuration data associated with the second content item session; and
        filtering, based at least in part on the second configuration data, first persistence data associated with the first content item session to generate second persistence data associated with the second content item session, wherein the second content item session uses the second persistence data;
    switching one or more users from the first set of users to the second set of users;
    executing the second content item session, wherein the second content item session has at least one second administrator that is included in the second set of users, wherein the at least one second administrator has authority to adjust settings of the second content item session; and
    continuing to execute the first content item session for at least a first time period after the generating of the second content item session.

16. The one or more non-transitory computer-readable storage media of claim 15, wherein the branching further comprises:
    copying a base definition associated with the first content item session and associating the base definition with the second content item session;
    modifying first configuration data associated with the first content item session to generate second configuration data associated with the second content item session; and
    filtering, based at least in part on the second configuration data, first persistence data associated with the first content item session to generate second persistence data associated with the second content item session.

17. The one or more non-transitory computer-readable storage media of claim 15, wherein the switching the one or more users from the first set of users to the second set of users comprises re-assigning the one or more users from communicating with one or more actors associated with the first content item session to communicating with one or more actors associated with the second content item session.

18. The one or more non-transitory computer-readable storage media of claim 15, wherein the at least one second administrator that is included in the second set of users receives compensation in exchange for serving as an administrator.

19. The one or more non-transitory computer-readable storage media of claim 15, wherein the operations further comprise merging the second content item session with an other content item session to generate a merged content item session.

20. The one or more non-transitory computer-readable storage media of claim 19, wherein the merging comprises:
    comparing the second configuration data associated with the second content item session with other configuration data associated with the other content item session to identify one or more conflicts;
    determining one or more resolutions to the one or more conflicts;
    modifying and combining, based at least in part on the one or more resolutions, the other configuration data and the second configuration data to generate third configuration data associated with the merged content item session; and
    filtering and combining, based at least in part on the third configuration data, the second persistence data associated with the second content item session and other persistence data associated with the other content item session to generate third persistence data associated with the merged content item session.

* * * * *